Figure 1:
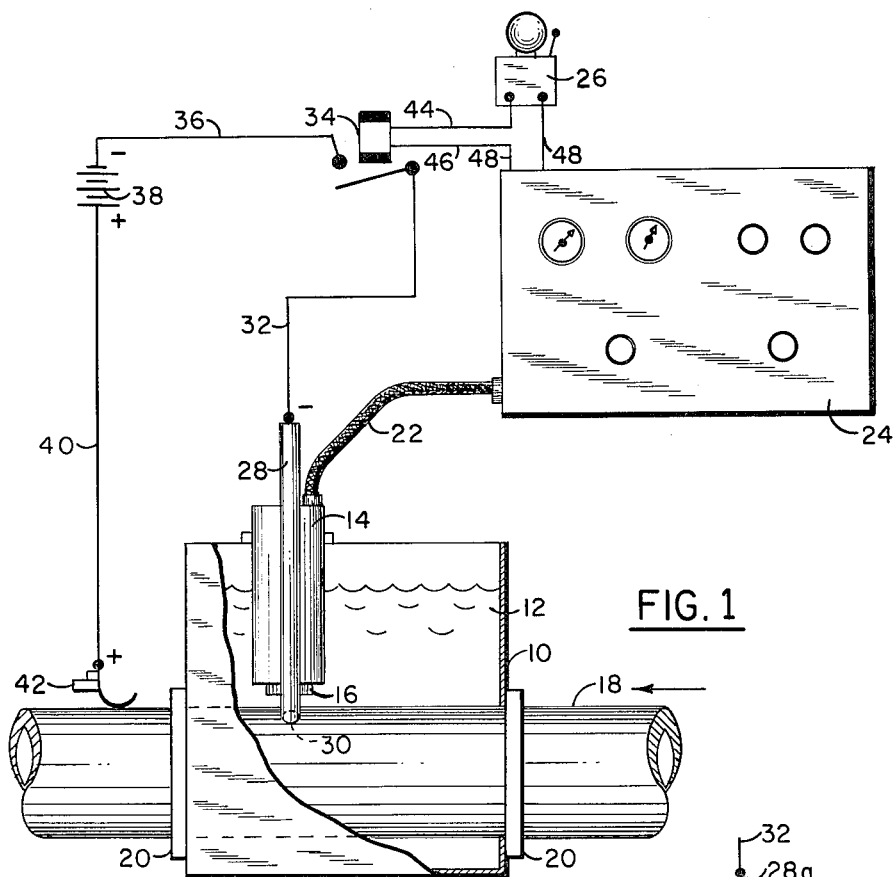

March 29, 1966 P. C. BARR ETAL 3,242,722

ULTRA-SONIC TESTING OF METAL BODIES

Filed June 17, 1963

INVENTORS.
Philip C. Barr
Daniel M. Taylor

BY

Agent ium Metals Corporation of America, New York, N.Y., a corporation of Delaware
Filed June 17, 1963, Ser. No. 288,271
5 Claims. (Cl. 73—67.8)

This invention relates to improvements in testing metal bodies for structural defects by ultra-sonic vibrations. More particularly, it relates to producing a mark on such a body to indicate the location of a structural defect detected by ultra-sonic testing.

Testing metal bodies for discontinuities, cavities, inclusions and other structural defects by ultra-sonic testing is widely practiced. In testing an elongated metal body, such as a tube or rod, a suitable container is provided containing an aqueous solution and the elongated body is passed progressively through such container from side to side while being rotated about its axis. The elongated body is immersed in the aqueous liquid during progressive travel through the container; its passage thruogh the container sidewalls being sealed by rubber grommets or the like.

A probe connected to suitable ultra-sonic testing equipment is also immersed in the aqueous solution in the container and is arranged with its working face close to or even contacting the surface of the elongated metal body. Ultra-sonic testing equipment is a standard article of commerce and readily available. Such equipment operates generally by generation of vibrations of ultra-sonic frequency at the working face of a probe, such vibrations being transmitted through the aqueous solution to the metal body surface. The vibrations travel through the metal body, being reflected by its remote surface back to the probe. Electronic systems in the equipment, often including an oscilloscope, analyze and compare the wave patterns of the original and reflected vibrations. Any reflection of vibrations other than from an intermediate interface existing in the metal body caused by a cavity, inclusion or discontinuity in the structure, will produce anomalous reflections which produce an abnormal wave pattern. Such anomalies can be detected electronically in the equipment and employed to trigger a signal such as the sounding of a buzzer or lighting of a light to indicate detection of a defect to the equipment operator.

Difficulties arise, however, when elongated metal bodies are being passed through the type of container holding aqueous solution described above and are progressively ultra-sonic tested. When the equipment signals a defect, the elongated metal body must be marked in some manner to show the location of the defect indicated by the probe, so that the defective portion of the body can be examined outside the container and the defect rectified, or the defective portion accepted or eliminated. Such marking, to be accurate, must be done while the portion of the metal body is still immersed in the aqueous solution, and often the mechanism for causing travel of the body through the container must be shut down in order to do this. Moreover, the mark must be made so that it will not rub off or become smeared when the body passes through the seal at the exit side of the container yet it must be readily removable later on and not damage or mar the metal body surface finish.

A similar problem is encountered when the metal body to be tested is immersed in a solution in a large open tank and the probe, also immersed, is caused to travel back and forth across the body surface covering adjoining strips so that the entire surface is eventually surveyed. Probe travel is often at high speed making precise location of defect areas difficult, and marking may involve shutting down the probe operation while a defect area is identified and manually marked.

Summarized briefly, this invention marks a metal body being ultra-sonic tested as described at a precisely located spot simultaneously with detection of a structural defect by the testing equipment during relative movement of the body being tested and the probe of the testing equipment. The marking is readily discernible and sufficiently permanent so that it will not rub off or smear yet can readily be later removed without damage to the metal body surface. This is accomplished by arranging an electrode immersed in the aqueous solution in the tank or container, the end of the electrode being located adjacent the ultra-sonic probe in fixed location relative thereto and also adjacent to the surface of the metal body being tested. The electrode is made the cathode and the metal body the anode, these being arranged in circuit with the negative and positive poles respectively of a source of direct electric current. This electric circuit includes a switch in one of the connections so that electric current can be caused to flow between the end of the cathode only when the ultra-sonic equipment indicates a structural defect in the metal body.

The aqueous solution in the tank or container contains sufficient ions to permit it to function as an electrolyte as well as a vibration transmitting medium and when current is passed between the electrode and the elongated metal body a small area of the surface of the metal body facing the electrode end will become anodized forming a readily discernible colored anodic oxide film. The anodized area forms an effective mark to show the location of the structural defect detected by the ultra-sonic equipment. It will be found to be permanent enough so that it cannot be rubbed off or smeared yet is very thin and can readily be removed later by a simple acid etch or application of fine mild abrasive.

The anodizing circuit can be energized manually by actuation of a switch by the equipment operator at times when defects are indicated. Preferably it will be connected to the ultra-sonic equipment so that energizing the signal system in this equipment will also trigger the anodizing circuit switch so that operation is completely automatic.

Figure 3:
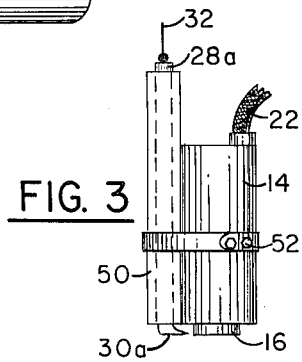
Figure 2:
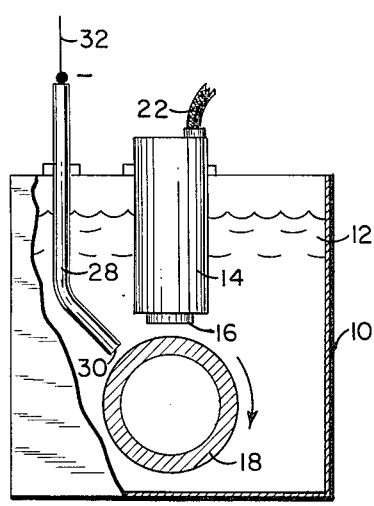

The following more detailed description of this invention will be more readily understood by reference to the drawings in which:

FIG. 1 shows a side view, partly broken out, of apparatus embodying features of this invention, FIG. 2 shows an end view, also broken out, of the container and associated structure shown in FIG. 1, and, FIG. 3 shows a side view of a probe and electrode in fixed relation.

Referring now to FIGS. 1 and 2, the apparatus comprises a container 10, adapted to hold an aqueous solution 12 in which is immersed the lower end of an ultra-sonic probe 14. The face 16 of probe 14 is, as is usual in such apparatus, designed to transmit high frequency vibrations through solution 12 to the surface of an elongated metal body to be tested for structural defects as, for example, in the embodiment illustrated, metal tube 18. Passage of tube 18 through the sidewalls of container 10 is sealed by rubber bushings 20 to prevent loss of solution 12 when tube 18 is moved progressively longitudinally through container 10 and also rotated so as to expose its surface progressively to vibrations transmitted by probe face 16. The movement of tube 18 through container 10 and also its rotation is accomplished by suitable conventional mechanism forming no part per se of this invention and not shown.

Probe 14 is connected electrically by cable 22 to ultra-sonic testing equipment of conventional design, which together with probe 14 is available commercially on the market and which is represented at 24. Such equipment includes means for energizing a transducer in probe 14 to produce high frequency vibrations and also electronic means for detecting anomalies in reflected wave patterns which indicate defects in the metal body being tested. Equipment 24 may be designed by suitable circuiting to actuate a signal such as buzzer 26, when such defects are detected.

Also immersed in solution 12 in container 10 is the lower part of electrode 28 whose bottom end 30 is located adjacent to probe face 16 and also adjacent the surface of tube 18 which it faces and is preferably placed transversely opposite probe 16 so that it will lie in the same general plane transverse to the longitudinal axis of tube 18. The upper end of electrode 28 is connected by lead 32 to relay switch 34 which in turn is connected by lead 36 to the negative pole of a source of direct electric current as battery 38. The positive pole of battery 38 is connected by lead 40 to sliding contact assembly 42 which bears on and makes electrical contact with the surface of tube 18 external of container 10.

The actuating coil of relay switch 34 is connected by leads 44 and 46 into one arm of the electrical circuit indicated at 48 by which signal buzzer 26 is energized to provide a signal when a flaw in tube 18 is detected. Thus energization of buzzer 26 will also energize the coil of relay 34 to close the electrode 28-battery 38 circuit to cause current to flow between electrode lower end 30 and area of the surface of tube 18 directly facing electrode end 30. This will cause formation of an anodic oxide film to effectively mark a spot when signal occurs.

FIG. 3 shows a probe and electrode in fixed relation, that is attached to each other to form an assembly particularly useful when the metal body to be tested is wholly immersed in a tank of aqueous solution and the probe is caused to travel over its surface to determine structural defects. In FIG. 3 probe 14 is fixed attached as by strap 52 to a slightly modified electrode 28a which may be insulated from probe 14 by jacket 50. The lower end, 30a of electrode 28a will thereby be maintained in fixed location relative to probe 14 and particularly the face 16 thereof. Probe 14 can be connected by cable 22 to an ultra-sonic testing unit and electrode 28a will be connected by wire 32 to an operative switch or relay in the same manner as these connections are made in the embodiment illustrated in FIGS. 1 and 2.

The method of marking according to this invention, by producing an anodized film, may be employed when testing metals which are anodizable to produce such films. Such metals include titanium, zirconium, tantalum, aluminum, magnesium and alloys of which they form the base or a major constituent. The colors produced by anodized films are most often interference colors, the hue being dependent on the film thickness which is largely controlled by the voltage applied. Various alloy ingredients may also change the color produced. It will be understood that any discernible anodic oxide deposit will serve as a mark, the actual color being immaterial. Bright colors ranging from blue through the spectrum colors to a type of red may be obtained on various metals, by employing voltages between 10 and 150 volts. Current at 20 volts has been found to produce a desirable blue colored anodic film which serves as a satisfactory mark on titanium metal. Anodic oxide films on aluminum and magnesium tend to be transparent and more difficult to discern. When employing the present invention in testing of such metals, some ions of metal such as chromium present in the aqueous solution will provide some coloration to the anodic film to render it more readily discernible.

Anodic oxide films form almost instantaneously under influence of electric current; therefore, it will be found that such films will form readily at desired locations as the elongated body to be tested is moved continually around and through the container holding the aqueous solution.

It is necessary that the aqueous solution function as an electrolyte as well as a vibration transmitting medium. It must, therefore, be a polar solution, that is containing sufficient ions to be electrically conductive. It will be apparent to those skilled in the art that a wide variety of acids, alkalis and salts may be added to ordinary water to produce an aqueous solution containing sufficient ions to function as an electrolyte. Dilute acids such as sulphuric, hydrochloric or nitric, sodium chloride and other common salts as well as dilute sodium or potassium hydroxide solutions may be used. Obviously acids, salts or bases of such strength to produce corrosion of equipment or samples should be avoided. Wetting agents, particularly those composed of benzene sulphonic acids and derivations are extremely effective, providing sufficient ions to produce a polar or conductive solution and in addition their wetting properties promote best possible transfer of vibrations between the probe and the surface of the body being tested through effective solution contact.

The anodic oxide deposits are tightly bonded and will not cause false ultra-sonic indications when passing under a probe. They will not readily rub off or smear. They will not be affected by passage of the elongated body through the rubber container sidewall seals. However, they are very thin, and may readily be purposely removed by a simple dip in an acid capable of dissolving the oxide. A combination of hydrofluoric and nitric acids is exceptionally effective, particularly with titanium and the thin anodized film can be removed readily by a short time immersion which will not materially etch or affect the metal surface. A household cleanser containing a mild abrasive may also be conveniently employed to wipe off the anodized area or areas.

For most precise location of defects indicated by the ultra-sonic testing equipment, it will be necessary to take into consideration the displacement of the end of the electrode with respect to the surface area being covered by the probe. When the end of the electrode is placed in the same transverse plane as the probe, this displacement will be angular around the circumference of a circular body being tested. Whatever the nature of the displacement, the relative location of the end of the electrode relative to the probe will be fixed and known. The displacement being known and being constant, the area of the metal surface covered by the probe when detection of a flaw occurs can be readily and precisely determined from the anodic oxide film simultaneously formed as an indicating mark.

We claim:
1. In a method for testing a body of metal selected from the group consisting of titanium, zirconium, tantalum, aluminum, magnesium and alloys of which they constitute a major portion, for structural defects in which at least a portion of said metal body is immersed in an aqueous solution held in a container and ultra-sonic vibrations are applied to an immersed surface of said metal body from a probe through said solution during relative movement between said probe and said metal body, structural defects in said metal body being indicated by anomalies in the reflection of said sonic vibrations back to said probe, the improvements which comprise:
  (a) providing electric current conducting ions in said aqueous solution,
  (b) applying a direct electric current between said metal body and an electrode immersed in said aqueous solution adjacent said probe and in fixed location relative thereto and adjacent said metal body, with the said metal body being connected to the positive pole of said current and the said electrode being connected to the negative pole thereof,
  (c) said current being of sufficient voltage to produce a colored anodic oxide film on an area of the surface of said metal body adjacent the end of electrode, and,
  (d) said current being applied to produce said colored film only when an anomaly in vibrations reflected back to said probe indicates a structural defect in said body.

2. In a method for testing a body of metal selected from the group consisting of titanium, zirconium, tantalum, aluminum, magnesium and alloys of which they constitute a major portion, for structural defects in which at least a portion of said metal body is immersed in an aqueous solution held in a container and ultra-sonic vibrations are applied to an immersed surface of said metal body from a probe through said solution during relative movement between said probe and said metal body, structural defects in said metal body being indicated by anomalies in the reflection of said sonic vibrations back to said probe, the improvements which comprise:
  (a) providing electric current conducting ions in said aqueous solution,
  (b) applying a direct electric current between said metal body and an electrode immersed in said aqueous solution adjacent said probe and in fixed location relative thereto and adjacent said metal body, with the said metal body being connected to the positive pole of said current and the said electrode being connected to the negative pole thereof,
  (c) said current applied at a voltage of between 10 and 150 volts thereby to produce a colored anodic oxide film on an area of the surface of said metal body adjacent the end of electrode, and,
  (d) said current being applied to produce said colored film only when an anomaly in vibrations reflected back to said probe indicates a structural defect in said body.

3. In apparatus for testing an anodizable metal body for structural defects which comprises a container holding a conductive aqueous solution in which at least a portion of said metal body is immersed, a probe immersed in said solution adapted to transmit ultra-sonic vibrations through said solution to an immersed surface of said metal body and to receive said vibrations reflected back from said metal body, means for generating said ultra-sonic vibrations and for analyzing and comparing the transmitted and reflected vibrations to detect an anomaly which indicates a structural defect in said body including signal means operating to call attention to said anomaly when detected, the improvements comprising:
  (a) an electrode immersed in said solution having its lower end adjacent to said probe and in fixed location relative thereto and adjacent to and facing the surface of said metal body,
  (b) a source of direct electric current having its positive pole connected to said metal body and its negative pole connected to said electrode, and,
  (c) a switch in one of the connections between said electric current source and said body and said electrode operable to cause current to flow between the end of said electrode and the adjacent surface of said body only when said signal means operates to indicate a structural flaw in said body.

4. In apparatus for testing an anodizable metal body for structural defects which comprises a container holding a conductive aqueous solution in which at least a portion of said metal body is immersed, a probe immersed in said solution adapted to transmit ultra-sonic vibrations through said solution to an immersed surface of said metal body and to receive said vibrations reflected back from said metal body, means for generating said ultra-sonic vibrations and for analyzing and comparing the transmitted and reflected vibrations to detect an anomaly which indicates a structural defect in said body including signal means operating to call attention to said anomaly when detected, the improvements comprising:
  (a) an electrode immersed in said solution having its lower end adjacent to said probe and in fixed location relative thereto and adjacent to and facing the surface of said metal body,
  (b) a source of direct electric current having its positive pole connected to said metal body and its negative pole connected to said electrode,
  (c) a switch in one of the connections between said electric current source and said body and said electrode, and,
  (d) means for actuating said switch to cause current to flow between the end of said electrode and the adjacent surface of said body only when said signal means operates to indicate a structural flaw in said body.

5. In apparatus for testing an anodizable metal body for structural defects which comprises a container holding a conductive aqueous solution in which at least a portion of said metal body is immersed, a probe immersed in said solution adapted to transmit ultra-sonic vibrations through said solution to an immersed surface of said metal body and to receive said vibrations reflected back from said metal body, means for generating said ultra-sonic vibrations and for analyzing and comparing the transmitted and reflected vibrations to detect an anomaly which indicates a structural defect in said body including signal means operating to call attention to said anomaly when detected, the improvements comprising:
  (a) an electrode immersed in said solution having its lower end adjacent to said probe and in fixed location relative thereto and adjacent to and facing the surface of said metal body,
  (b) a source of direct electric current having its positive pole connected to said metal body and its negative pole connected to said electrode, and,
  (c) a relay switch in one of connections between said electric current source and said body and said electrode, said relay switch having its energizing coil connected in the circuit operating said signal means to cause current to flow between the end of said electrode and the adjacent surface of said metal body only when said signal means operates to indicate a structural flaw in said body.

References Cited by the Examiner
UNITED STATES PATENTS
3,051,956   8/1962   Theobald _____ 73—67.9

FOREIGN PATENTS
736,464   7/1953   Great Britain.

RICHARD C. QUEISSER, *Primary Examiner.*

LAWRENCE R. FRANKLIN, *Assistant Examiner.*